(12) United States Patent
Ding et al.

(10) Patent No.: US 11,134,534 B2
(45) Date of Patent: Sep. 28, 2021

(54) SYSTEM ON A CHIP WITH MULTIPLE CORES

(71) Applicant: Avago Technologies General IP (Singapore) Pte. Ltd., Singapore (SG)

(72) Inventors: Shawn Ding, San Diego, CA (US); Chikan Kwan, San Diego, CA (US); Hea Joung Kim, Irvine, CA (US); David Lee Recker, Saratoga, CA (US); Brandon Bongkee Bae, San Diego, CA (US); Yuan Zhuang, San Diego, CA (US); Guoxin Xie, San Diego, CA (US); Seema B. Anand, Irvine, CA (US); John S. Walley, Ladera Ranch, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 108 days.

(21) Appl. No.: 15/950,045

(22) Filed: Apr. 10, 2018

(65) Prior Publication Data

US 2019/0124712 A1   Apr. 25, 2019

Related U.S. Application Data

(60) Provisional application No. 62/576,037, filed on Oct. 23, 2017.

(51) Int. Cl.
| | | |
|---|---|---|
| *H04B 7/00* | (2006.01) |
| *H04W 76/25* | (2018.01) |
| *H04B 1/40* | (2015.01) |
| *H04W 4/80* | (2018.01) |
| *H04B 1/48* | (2006.01) |
| *H04W 88/02* | (2009.01) |

(52) U.S. Cl.
CPC ............ *H04W 76/25* (2018.02); *H04B 1/40* (2013.01); *H04B 1/48* (2013.01); *H04W 4/80* (2018.02); *H04W 88/02* (2013.01)

(58) Field of Classification Search
CPC ....... H04W 76/25; H04W 4/80; H04W 88/02; H04B 1/40
USPC ...................................... 455/41.2
See application file for complete search history.

(56) References Cited

U.S. PATENT DOCUMENTS

| | | | | |
|---|---|---|---|---|
| 6,895,255 B1* | 5/2005 | Bridgelall | ............... | H04L 29/06 455/552.1 |
| 7,734,251 B1* | 6/2010 | Harvey | ............. | H04N 21/4117 |
| 7,769,344 B1* | 8/2010 | Harvey | ................ | H04N 21/818 455/39 |
| 8,290,461 B1* | 10/2012 | Sankaran | ............. | H03G 3/3078 455/232.1 |
| 8,503,929 B2* | 8/2013 | Ibrahim | ................ | H04H 20/08 455/41.1 |

(Continued)

*Primary Examiner* — April G Gonzales
(74) *Attorney, Agent, or Firm* — Morgan, Lewis & Bockius LLP

(57) ABSTRACT

An apparatus includes multiple radio-frequency (RF) circuits, a number of Bluetooth (BT) cores and a processor. The BT cores are coupled to the plurality of RF circuits. The processor is coupled to the BT cores to control operations of the RF circuits and the BT cores. The RF circuits, the BT cores and the processor are implemented as a system on a chip (SoC). Controlling the operations of the RF circuits and the BT cores can be performed by controlling register spaces associated with the RF circuits and the BT cores.

20 Claims, 15 Drawing Sheets

(56) References Cited

U.S. PATENT DOCUMENTS

| | | | | |
|---|---|---|---|---|
| 9,292,982 B1* | 3/2016 | Higgs | | G07C 5/008 |
| 9,294,903 B2* | 3/2016 | Palin | | H04W 8/005 |
| 9,395,384 B1* | 7/2016 | Dosher | | G01S 19/14 |
| 9,576,407 B1* | 2/2017 | Higgs | | G06Q 40/12 |
| 9,614,562 B2* | 4/2017 | Demay | | H04B 1/525 |
| 9,629,122 B2* | 4/2017 | Yoon | | H04M 1/72412 |
| 9,888,495 B2* | 2/2018 | Koskela | | H04B 7/15507 |
| 9,929,849 B2* | 3/2018 | Medapalli | | H04W 72/1215 |
| 9,939,881 B2* | 4/2018 | Sinha | | G06F 1/3253 |
| 10,026,131 B1* | 7/2018 | Dosher | | G07C 5/0816 |
| 10,042,038 B1* | 8/2018 | Lord | | G01S 5/26 |
| 10,210,679 B1* | 2/2019 | Higgs | | G06Q 10/06 |
| 10,319,037 B1* | 6/2019 | Chan | | G06Q 40/08 |
| 2002/0038416 A1* | 3/2002 | Fotland | | G06F 1/324 |
| | | | | 712/228 |
| 2006/0221920 A1* | 10/2006 | Gopalakrishnan | | H04B 7/0617 |
| | | | | 370/338 |
| 2006/0268965 A1* | 11/2006 | Ibrahim | | H04H 40/18 |
| | | | | 375/149 |
| 2006/0269004 A1* | 11/2006 | Ibrahim | | H04L 27/34 |
| | | | | 375/260 |
| 2006/0269021 A1* | 11/2006 | Ibrahim | | H04B 1/1027 |
| | | | | 375/346 |
| 2006/0270337 A1* | 11/2006 | Ibrahim | | H03J 1/0008 |
| | | | | 455/3.01 |
| 2006/0270346 A1* | 11/2006 | Ibrahim | | H04B 1/406 |
| | | | | 455/41.2 |
| 2006/0270347 A1* | 11/2006 | Ibrahim | | H04H 20/08 |
| | | | | 455/41.2 |
| 2006/0270348 A1* | 11/2006 | Ibrahim | | H04B 1/3805 |
| | | | | 455/41.2 |
| 2008/0242347 A1* | 10/2008 | Zetterman | | H04B 1/406 |
| | | | | 455/552.1 |
| 2008/0311852 A1* | 12/2008 | Hansen | | H04W 88/06 |
| | | | | 455/41.2 |
| 2010/0009632 A1* | 1/2010 | Ibrahim | | H04W 52/267 |
| | | | | 455/41.2 |
| 2012/0099540 A1* | 4/2012 | Doppler | | H04J 11/0033 |
| | | | | 370/329 |
| 2012/0250532 A1* | 10/2012 | Husted | | H04W 74/0808 |
| | | | | 370/252 |
| 2013/0120958 A1* | 5/2013 | Yu | | H05K 9/0066 |
| | | | | 361/818 |
| 2013/0258921 A1* | 10/2013 | Gevorkov | | H04W 72/1242 |
| | | | | 370/311 |
| 2014/0148107 A1* | 5/2014 | Maltsev | | H04L 27/2626 |
| | | | | 455/91 |
| 2015/0189686 A1* | 7/2015 | Kasher | | H04M 1/72412 |
| | | | | 455/41.2 |
| 2017/0163931 A1* | 6/2017 | Redgrave | | G11C 19/00 |
| 2017/0331577 A1* | 11/2017 | Parkvall | | H04J 11/0079 |
| 2017/0331670 A1* | 11/2017 | Parkvall | | H04J 11/0056 |
| 2017/0344512 A1* | 11/2017 | Jen | | G06F 13/4068 |
| 2020/0344618 A1* | 10/2020 | Shetiya | | H04W 74/0808 |

* cited by examiner

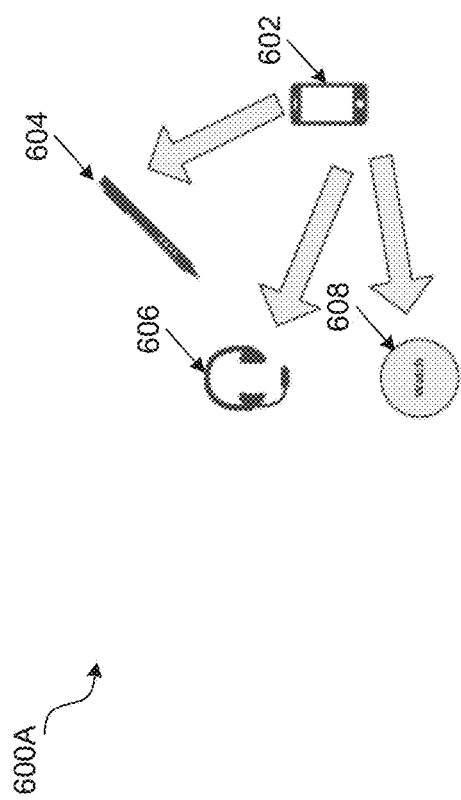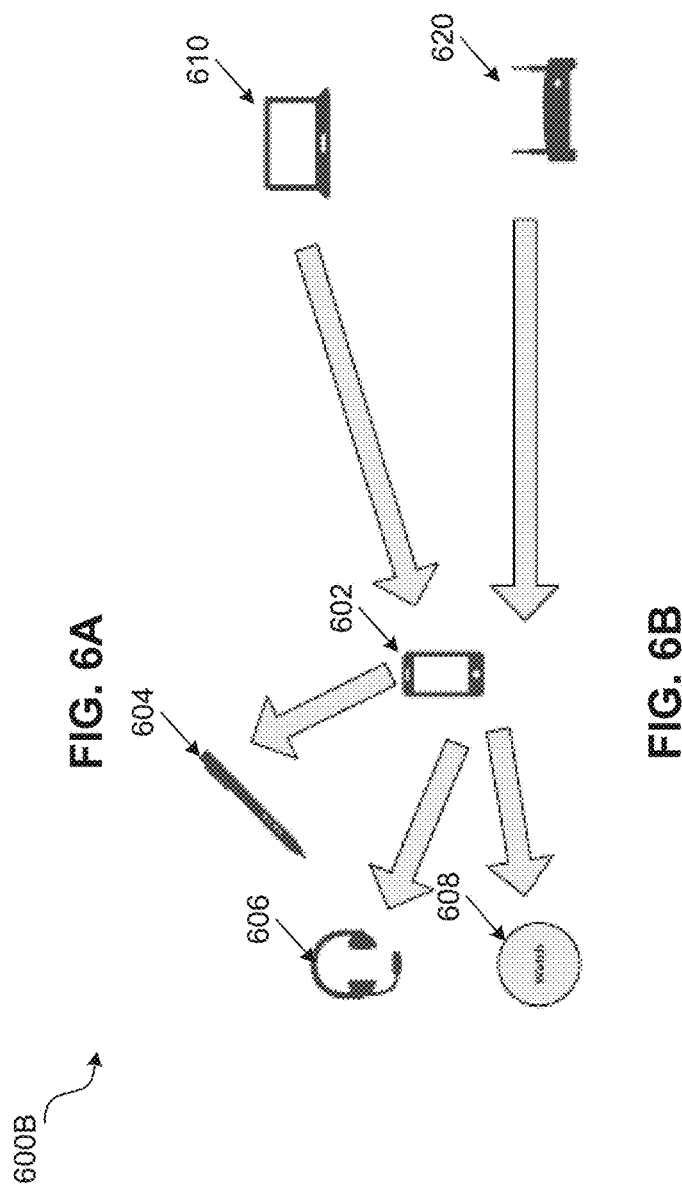

SYSTEM ON A CHIP WITH MULTIPLE CORES

CROSS-REFERENCE TO RELATED APPLICATIONS

This application claims the benefit of priority under 35 U.S.C. § 119 from U.S. Provisional Patent Application 62/576,037 filed Oct. 23, 2017, which is incorporated herein by reference in its entirety.

TECHNICAL FIELD

The present description relates generally to integrated circuits, and more particularly, to a system on a chip with multiple Bluetooth cores.

BACKGROUND

Bluetooth technology has become a ubiquitous short distance wireless communication vehicle among many industries such as the internet-of-things (IoT), infotainment, entertainment, gaming, TV, drone, payment and other modern industries. One major challenge with Bluetooth technology nowadays is that the exploding applications attempting to run on a Bluetooth device exceeds the capacity of the underlying Bluetooth radio. The limitation often occurs in the number of active links a Bluetooth (BT) radio can maintain simultaneously and the amount of overall data throughput or activities, such as BT and/or low energy (LE) connections and LE scanning for beacons activity that the BT radio can handle instantaneously. A major challenge with BT technology is the competition with Wi-Fi for airtime for BT-Wi-Fi coexistence. A strong desire with respect to short distance wireless communication systems such as BT communication systems is to stretch the range of the link that can be successfully maintained.

BRIEF DESCRIPTION OF THE DRAWINGS

Certain features of the subject technology are set forth in the appended claims. However, for purposes of explanation, several embodiments of the subject technology are set forth in the following figures.

FIGS. 6A-6B are conceptual diagrams illustrating examples of use cases of a multiple BT cores system, according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, systems and configurations are described for providing a system on a chip (SoC) multi-core Bluetooth (BT) radio. The SoC multi-core BT radio of the subject technology addresses a number of challenges facing the BT technology such as simultaneously maintaining a number of active links with an increased amount of overall data throughput and various BT activities, as well as BT-Wi-Fi coexistence and stretching the range of successfully maintained links. For example, challenging issues such as multiple BT and/or low energy (LE) connections and LE scanning for beacons activity can be handled instantaneously by the multi-core BT radio. The disclosed technology can open up a new world to service more devices and robustly deal with complex use cases. The subject technology allows a seamless coexistence with other communication technologies and provides a better user experience.

Figure 1A:
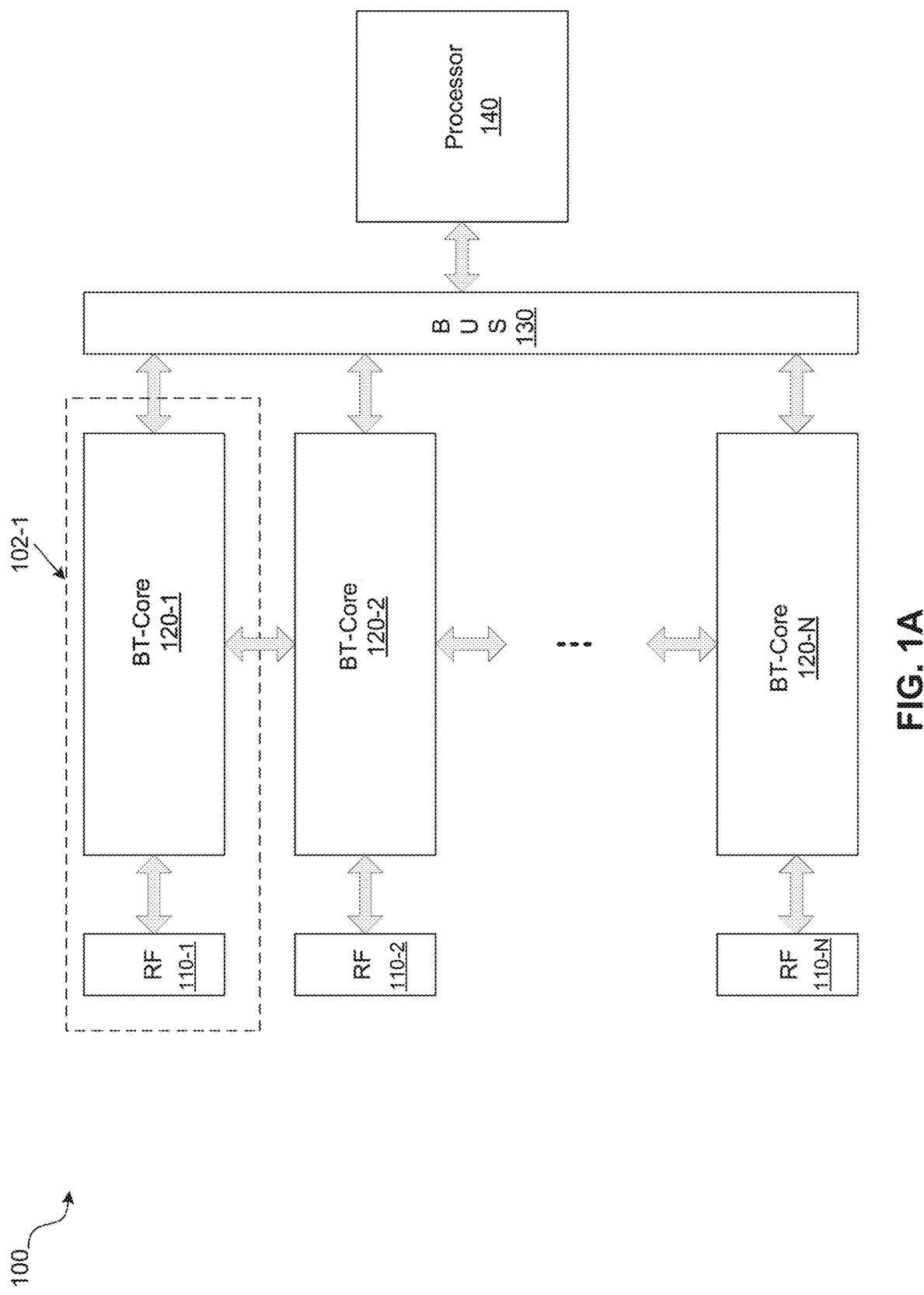
FIG. 1A is a high-level block diagram illustrating an example of a system on a chip (SoC) with multiple Bluetooth (BT) cores, according to aspects of the subject technology.

FIG. 1A is a high-level block diagram illustrating an example of a system on a chip (SoC) 100 with multiple Bluetooth (BT) cores, according to aspects of the subject technology. Not all of the depicted components may be used in all implementations; however, one or more implementations may include additional or different components than those shown in the figure. Variations in the arrangement and type of the components may be made without departing from the spirit or scope of the claims as set forth herein. Additional components, different components, or fewer components may be provided.

The SoC 100 includes multiple radio-frequency (RF) circuits 110 (e.g., 110-1, 110-2 . . . 110-N) and a number of Bluetooth (BT) cores 120 (e.g., 120-1, 120-2 . . . 120-N) coupled via a bus 130 to a processor 140. The BT cores 120 are coupled to respective RF circuits 110 to receive or transmit RF and control signals. Each BT core (e.g., 120-1) and the respective RF circuits (e.g., 110-1) can be referred to as a BT radio 102-1. The BT cores 120 are in communication with the processor 140 and transmit to and/or receive from the processor 140 data and control signals. The data includes data derived from the received RF signals and data for transmission via the RF circuits 110. The control signals can include, for example, register control signals that control a number of registers in the RF circuits 110 and/or the BT cores 120. The existence of multiple BT cores 120 on the SoC chip 110 is a feature of the subject technology that allows for advantageous features that are not provided by the existing single BT core solutions. For example, the SoC 100 can simultaneously maintain a number of active links with an increased amount of overall data throughput and extended ranges, and can further allow various BT activities as well as coexistence with Wi-Fi and other communication technologies.

Figure 1B:
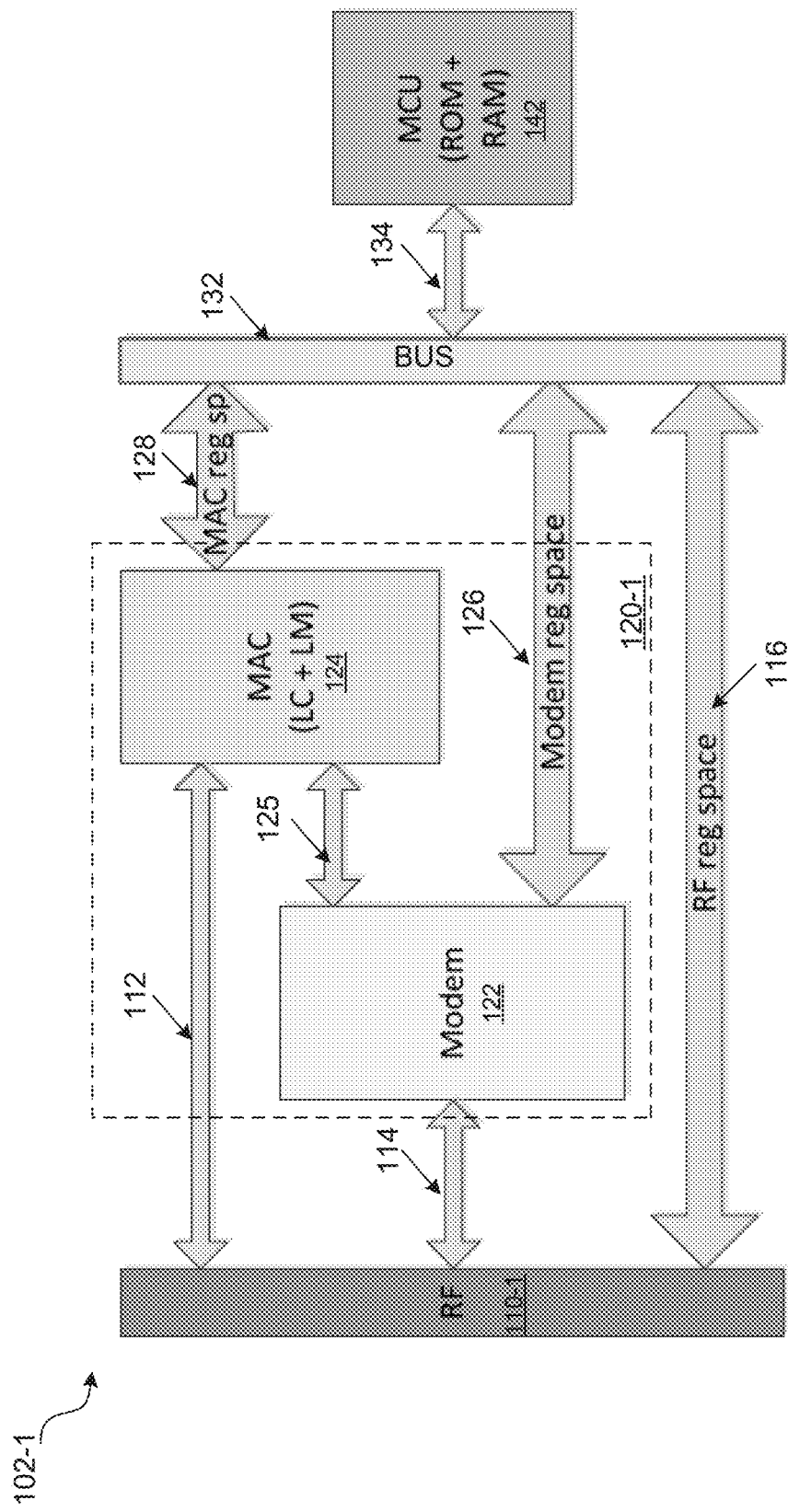
FIG. 1B is a block diagram illustrating an example architecture of a single BT core of the multiple BT cores of FIG. 1A, according to aspects of the subject technology.

FIG. 1B is a block diagram illustrating an example architecture of a single BT radio 102-1 of the multiple BT cores 120 of FIG. 1A, according to aspects of the subject technology. Not all of the depicted components may be used in all implementations; however, one or more implementations may include additional or different components than those shown in the figure. Variations in the arrangement and type of the components may be made without departing from the spirit or scope of the claims as set forth herein. Additional components, different components, or fewer components may be provided.

The single BT radio 102-1 includes, but is not limited to, an RF circuit 100-1, a BT core 120-1, including a modulator-demodulator (modem) 122 and a media-access-control (MAC) unit 124, a bus 132 and a processor such as a microcontroller unit (MCU) 142. The RF circuit 100-1 includes one or more RF transceivers including, but limited to, diplexers, low-noise amplifiers (LNAs), mixers, filters and variable gain amplifiers (VGAs). The RF circuit 110-1 can be coupled to one or more antennas. The modem 122 includes suitable hardware (HW) and firmware (FW) and/or software (SW) for modulating carrier signals to encode digital information for transmission by the RF circuit 110-1 and demodulating RF signals received from the RF circuit 110-1 to decode the received information. The modem 122 communicates RF signals and baseband signals with the RF circuit 110-1 via the link 114. The MAC unit 124 includes, but is not limited to, a link controller (LC) and a link manager (LM). The MAC unit 124 is responsible for a number of functionalities including, but not limited to, frame delimiting and recognition, destination addressing, error protection and control of access to the modem 122 and the RF circuit 110-1. The MAC unit 124 is coupled to the RF circuit 110-1 and the modem 124 via links 112 and 125, respectively. In some implementations, the bus 132 can be an advanced high-performance bus (BUS).

The modem 122 can be controlled by the MAC unit 124 (via the link 125) and/or by the MCU 142 (via a link 126). The MCU 142 may include read-only memory (ROM) and random-access memory (RAM) and can control register spaces of the RF circuit 110-1 (via a link 116), the modem 122 (via the link 126), and the MAC unit 124 (via a link 128). For example, the MCU 142 can control register spaces of the RF circuit 110-1 to control transmission power level, frequency and other parameters of the RF circuit 110-1. The MCU 142 can control, for example, modulation schemes, low-energy (LE) operation and other functionalities of the modem 122 via controlling the register spaces of the modem 122. The register space of the MAC unit 124 can also be controlled by the MCU 142 to control, for example, data security, encryption and other aspects of the functionalities of the MAC unit 124. In one or more implementations, the control of the MCU 142 over the RF circuit 110-1, the modem 122 and the MAC unit 124 can be exerted via FW running on the MCU 142, which can control traffic patterns, data rates, transmit power, channel maps and other aspects of the BT core 102-1.

It is understood that the single BT radio 102-1 can support up to seven BT unicast links (according to BT version 5.0 specification). The highest data rate for different modulation schemes or PHYs are specified as follows: 1 Mbps for basic rate (BR), 22 Mbps for enhanced data rate (EDR) with π/4 differential quadrature phase shift keying (DQPSK), 3 Mbps for EDR 8 PSK, 125 Kbps for LE long range (LR) 125 K, 500 Kbps for LELR 500 K, 1 Mbps for LE1M and 2 Mbps for LE2M. When more than one of the above PHYs is used, the average data rate for any PHY may be reduced because the single BT radio has to run in a time division multiplexing (TDM) mode. The two or more BT cores of the subject technology are built into one SoC to increase the overall number of simultaneously supported links. With more than one BT core present in a SoC, additional benefits may be obtained with different techniques that are further described herein.

Figure 2:
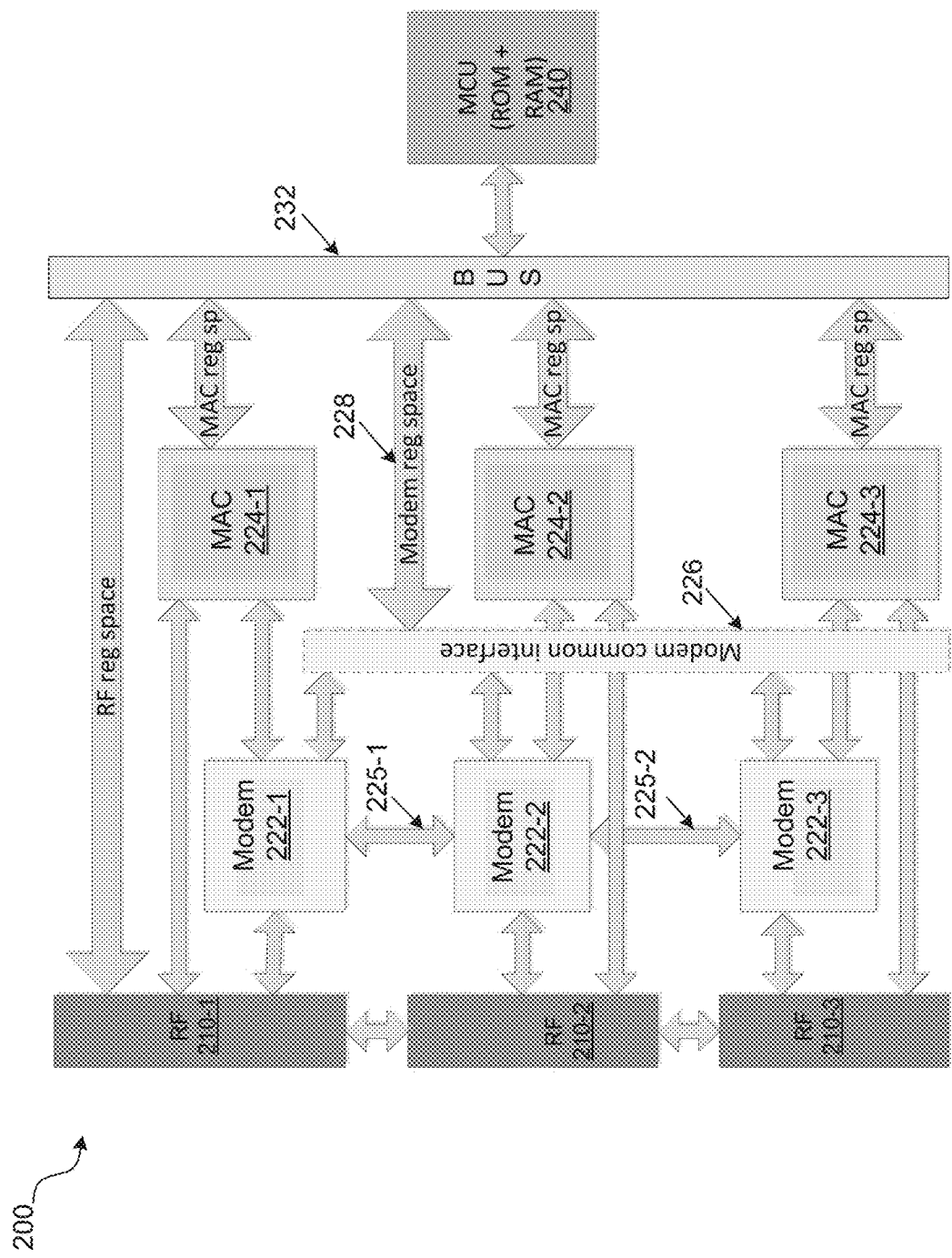
FIG. 2 is a block diagram illustrating an example architecture of a SoC with multiple BT cores, according to aspects of the subject technology.

FIG. 2 is a block diagram illustrating an example architecture of a SoC 200 with multiple BT cores, according to aspects of the subject technology. Not all of the depicted components may be used in all implementations; however, one or more implementations may include additional or different components than those shown in the figure. Variations in the arrangement and type of the components may be made without departing from the spirit or scope of the claims as set forth herein. Additional components, different components, or fewer components may be provided.

The architecture of the SoC 200, as depicted in FIG. 2, shows an example logical block representation of the SOC 100 of FIG. 1A with only three BT radios, but the subject technology is not limited to three BT radios and can have multiple BT radios. In the architecture of the SoC 200 each BT core 120 of FIG. 1A is replaced with respective modem and MAC units similar to the single BT core 120-1 of FIG. 1B. RF circuits 210 (e.g., 210-1, 210-2 and 210-3), modems 222 (e.g., 222-1, 222-2 and 222-3) and MAC units 224 (e.g., 224-1, 224-2 and 224-3) are respectively similar to the RF circuit 110-1, the modem 122 and the MAC unit 124 of FIG. 1B. The modems 222 are coupled to one another via links 225-1 and 225-2. A modem common interface block 226 can coordinate and synchronize functionalities of the modems 222, for example, using control signals received, via a link 228 and an BUS 232, from a processor (e.g., an MCU) 240, which can suitably control register spaces of the modem 222. The MCU 240 is similar to the MCU 140 of FIG. 1B, and a scheduler FW running on the MCU 240 can control the modems 222 and the RF circuits 210 (e.g., 210-1, 210-2 and 210-3). The scheduler can also synchronize and control components of the MAC units 224.

In one or more implementations, the multiple BT cores are not necessarily identical based on the system requirements. For example, when maximum-ratio combining (MRC) functionality is needed, at least the RF circuit and modes of two or more BT cores involved have to have the same configurations. In some aspects, the multiple BT cores could simultaneously receive (Rx) from the same transmission (Tx) source or different Tx sources. There are no strict requirements to the channel frequencies for each Rx path. In one or more aspects, the multiple BT cores could simultaneously transmit to N or more different Rx devices. When simultaneous Tx happens to two or more devices, an appropriate frequency management and antenna de-sense planning scheme is applied to achieve the optimal performances.

Figure 3:
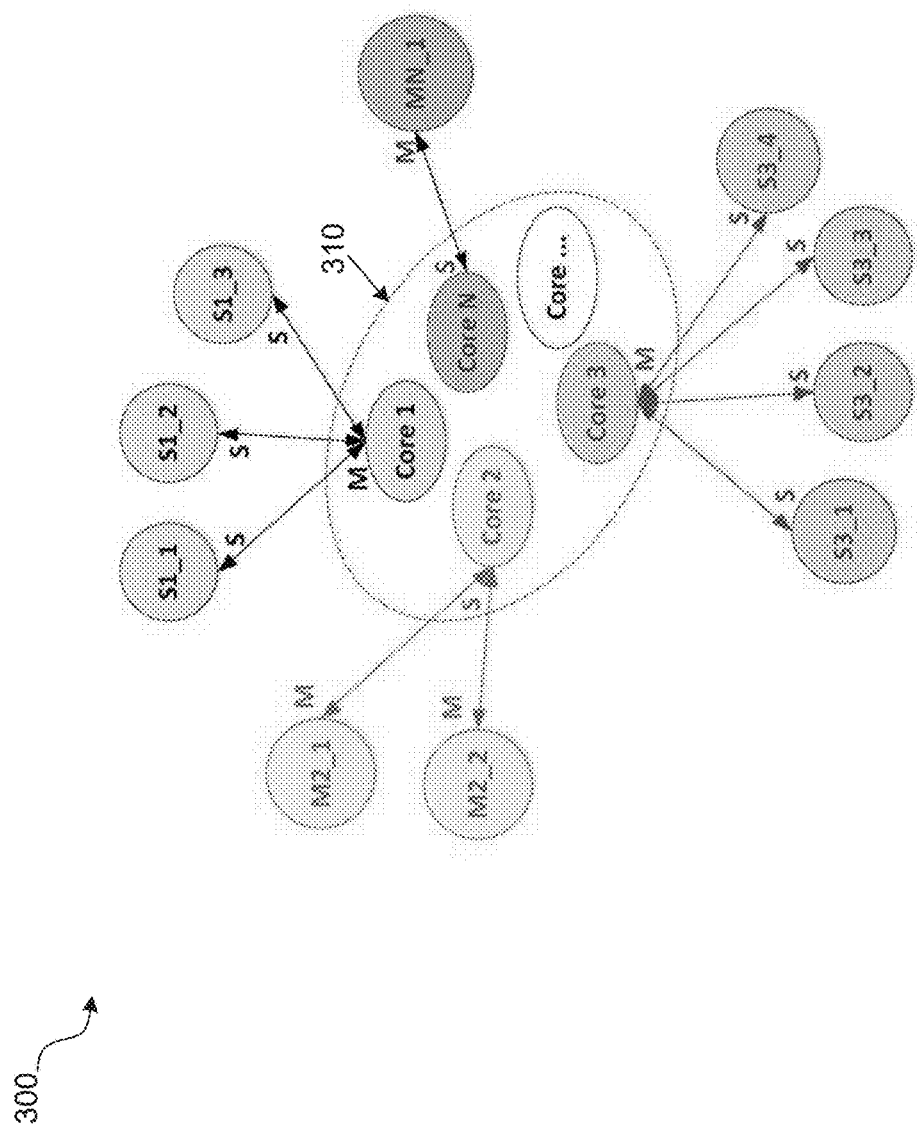
FIG. 3 is a block diagram illustrating an example of a multiple connection scheme of a multiple BT cores system, according to aspects of the subject technology.

FIG. 3 is a block diagram illustrating an example of a multiple connection scheme 300 of a multiple BT cores system, according to aspects of the subject technology. In the connection scheme 300, multiple BT cores (e.g., Core 1, Core 2 . . . Core N) of a SoC 310, which can be similar to the SoC 200 of FIG. 2, are in connection with a number of BT devices. Preferably all the connections with the SoC 310 as a master role are placed with one core if the bandwidth and number of connections limits are not exceeded. However, if it is not viable to place all the connections with a master role into one core, then another core can be assigned for this purpose. In the example of SoC 310, the Core 1 is in connection, as a master role, with three BT devices S1-1, S1-2 and S1-3 as having slave roles, and the Core 3 is in connection, as a master role, with four BT devices S3-1, S3-2, S3-3 and S3-4, which have slave roles. For slave role connections the arrangement can be based on BR and/or EDR or LE connection type, over the air bandwidth, connection parameters and other factors. In the example of SoC 310, Cores 2 is shown to be in a slave role in connection with BT devices M2-1 and M2-2, and Core N is in a slave role in connection with BT device MN-1.

With regard to multiple connections, a feature of the subject technology is frequency management discussed herein. For the operations that the processor (e.g., the scheduler FW) can implement channel selection, the scheduler FW may try to partition the channel map into different groups to reduce potential collisions. As a strategy, the frequencies used by the multiple connections at any instance of time cannot overlap. In other words, the processor can perform the frequency management to prevent a single channel frequency to be simultaneously used by more than one connection. In particular, when Tx and Rx activities happen at the same time, the channel frequencies have to have an offset of about 3 MHz or more. Examples of dividing the channel map into groups to avoid collision are provided herein. In some aspects, when there are three BR and/or EDR cores used simultaneously, the channel maps can be classified (if viable) as follows: Channel 0 to Channel 25 assigned to Core 1, Channel 27 to Channel 53 assigned to Core 2 and Channel 55 to Channel 78 assigned to Core 3. For LE connections, for example, the channel map can be as follows: LE channel 0 to 11 assigned to Core 1, LE channel 13 to 24 assigned to Core 2 and LE Channel 26 to Channel 36 assigned to Core 3. It is understood that BR and/or EDR specification allocates 79 channels (0-78), and LE specification defines 3 advertising channels (37, 38, 39) and 37 data channels (0-36). The above channel arrangement may not be always possible because of existence of Wi-Fi and other radio interferences in the same frequency domain neighborhood (e.g., 2400 MHz to 2483 MHz). When the total number of clean (e.g., with no interference) radio frequency channels are limited and some of the channels have to be used for more than one BT cores, timing division multiplexing (TDM) can be employed to make sure that two frequencies are not used at the same time, as described below.

FIGS. 4A through 4F are timing diagrams illustrating examples timing management schemes 400A through 400F of a multiple BT cores system, according to aspects of the subject technology. The multiple BT core approach supports simultaneous Tx and Rx operations. The scheduler firmware helps with arranging the Tx and Rx timing to avoid overlapping the Tx and Rx timing of various cores, as described herein with respect to FIGS. 4A through 4F.

Figure 4A:
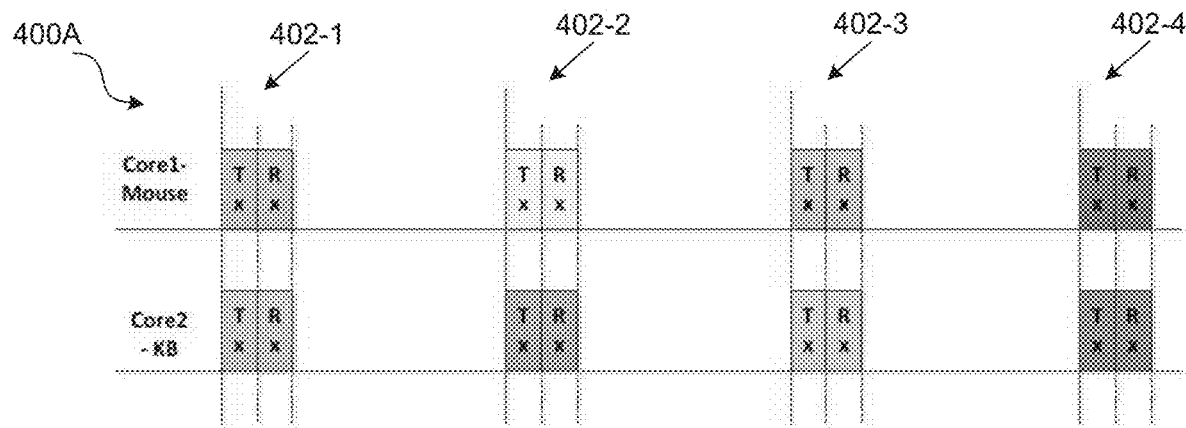
FIGS. 4A through 4F are timing diagrams illustrating examples timing management schemes of a multiple BT cores system, according to aspects of the subject technology.

The example timing management scheme 400A shown in FIG. 4A is for a SoC that uses two BR and/or EDR cores to control a mouse and a keyboard (KB). Both mouse and keyboard are in connection with cores (e.g., Core1 and Core2) of a multiple BT core SoC such as SoC 200 of FIG. 2 and use single slot packets in a sniff mode. As long as Tx and Rx timings 402 (e.g., 402-1, 402-2 . . . 402-4) of Core 1 and Core2 are aligned the air time between the Tx-Rx pairs can be used for other radio activities such as BT, LE, Wi-Fi or 802.15 activities.

Figure 4B:
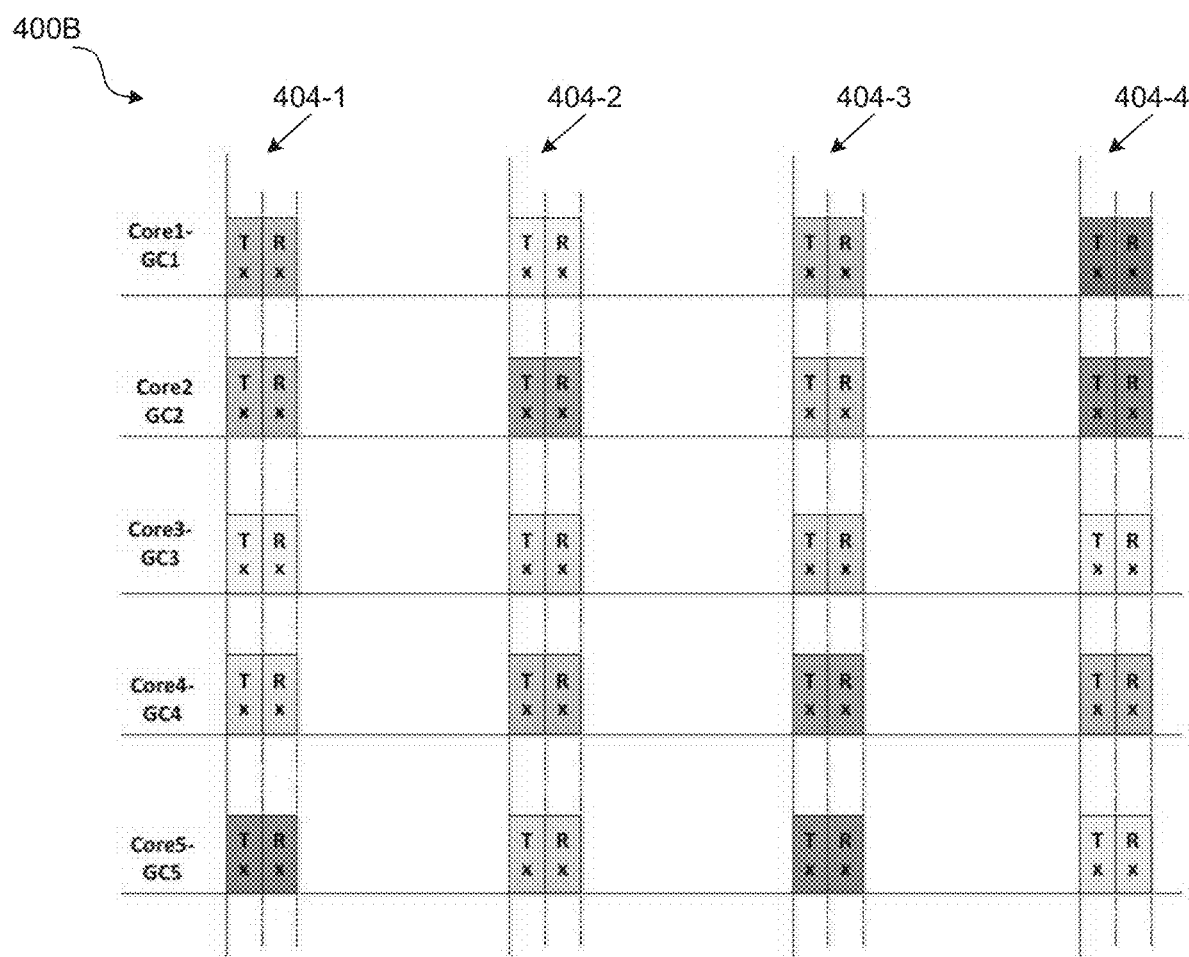

Another example is the time management scheme 400B shown in FIG. 4B with five cores (e.g., Core 1, Core 2 . . . Core 5) being in connection with five BR/EDR remote or gaming controllers (GCs, e.g., GC1, GC2 . . . GCS) that use only 1-slot packets. The Tx and Rx timings 404 (e.g., 404-1, 404-2 . . . 404-4) of Core 1 through Core 5 are aligned, and the air times between the Tx-Rx pairs can be used for other purposes such as Wi-Fi, which can make the BT-Wi-Fi coexistence usage favorable to the Wi-Fi traffic.

Figure 4C:
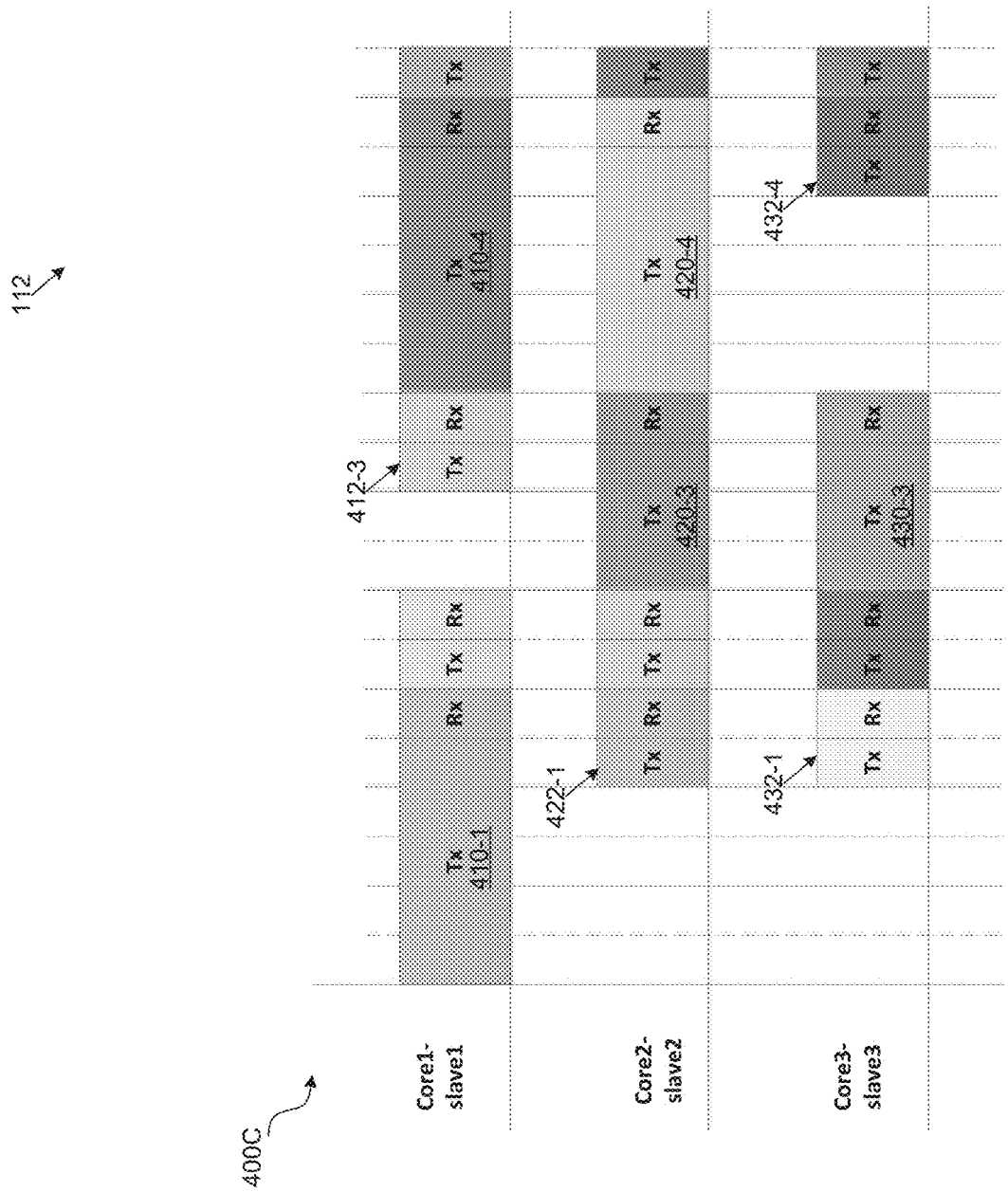

The time management scheme 400C shown in FIG. 4C indicates three BR/EDR cores (e.g., Core 1, Core 2 and Core 3) in connection with three slave devices (e.g., slave1, slave2 and slave3). The scheduler FW avoids Tx and Rx events to occur at the same time for the three cores. The scheduler FW uses this approach to utilize the multiple BT cores efficiently. Slave 1 can, for example, be an A2DP link which uses 5 slot packet types. Slave 2 and slave 3 can, for instance, be generic links that carry L2CAP data traffic. In the time management scheme 400C, a number of Tx events such as 410-1, 410-4, 420-3, 420-4 and 430-3 take more than one slot, and the scheduler FW has to adjust timings of TX events 412-3, 422-1, 432-1 and 432-4 to align remaining Rx-Tx timings as shown.

Figure 4D:
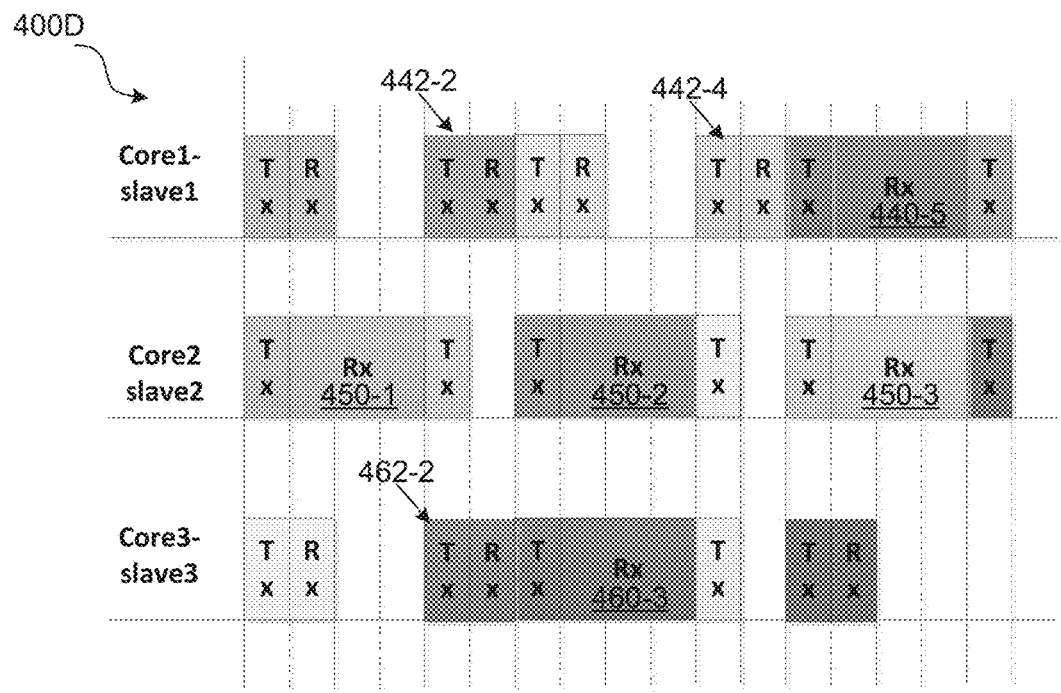

The next example is the time management scheme 400D shown in FIG. 4D for three BR/EDR cores (e.g., Core 1, Core 2 and Core 3) in connection with three slave devices (e.g., slave1, slave2 and slave3). The time management scheme 400D shows that as long as the Tx and Rx timings can be arranged such that no Tx and Rx happen simultaneously the total capacity of the multiple BT core SoC approach can be increased significantly. The RX events 440-5, 450-1, 450-2, 450-3 and 460-3 are extended to three time slots and the scheduler FM has to adjust timings of TX events 442-2, 442-4 and 462-2 to align remaining Rx-Tx timings as shown.

Figure 4E:
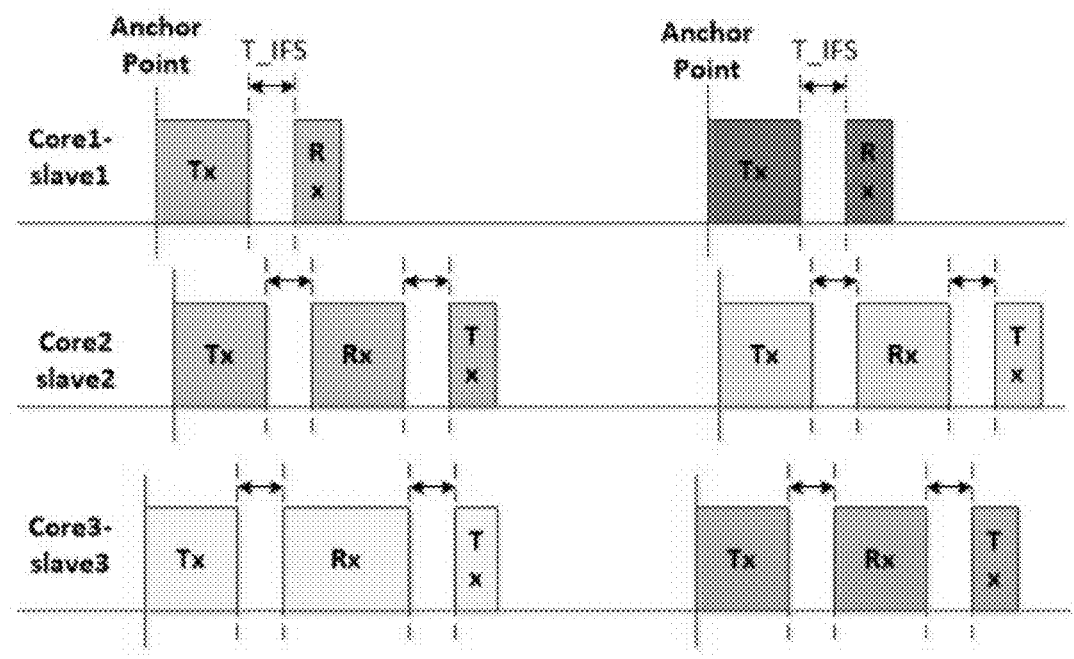

For multiple LE cores the scheduling can be challenging because LE does not have a well-defined (e.g., 1.25 ms) frame structure as BR/EDR does. The LE cores does have a well-defined 150 ms inter-frame spacing (T_IFS) value that the scheduler can work with. The time management scheme 400E shown in FIG. 4E is an illustration of a 3-LE core scheduler behavior. The scheduler can arrange the Tx and Rx timing by selecting the Tx data length such that Tx and Rx don't happen at the same instant. This can be done somewhat deterministically with LE human input device (HID) scheduling as the data coming from a mouse or a keyboard are fixed in size. The scheduler can use the same anchor point for both devices and send a polling data packet to get the input data from the LE mouse, keyboard or other HID devices. The challenge is when Tx and Rx events happen at the same time. The Tx event can have a significant influence on the Rx event performance due to antenna proximity. It may be worse if the frequency used for Tx and Rx are the same or the hamming distance between Tx and Rx frequencies is only 1 or 2 (e.g., difference in frequencies of about 1 or 2 MHz). Therefore, an override mechanism allowing one core to override the other can be designed into the system such that one core can terminate the other core's Tx if it is in the middle of a crucial Rx events. For example, during an inquiry, a page or an LE advertising, the channels are fixed. Such a mechanism is needed to let the inquiry/page/advertising stay on the Rx or Tx channel when there is a response such as a default payload setting (FHS) packet, an enhanced inquiry response (EIR) data, an advertisement response or other responses.

Figure 4F:
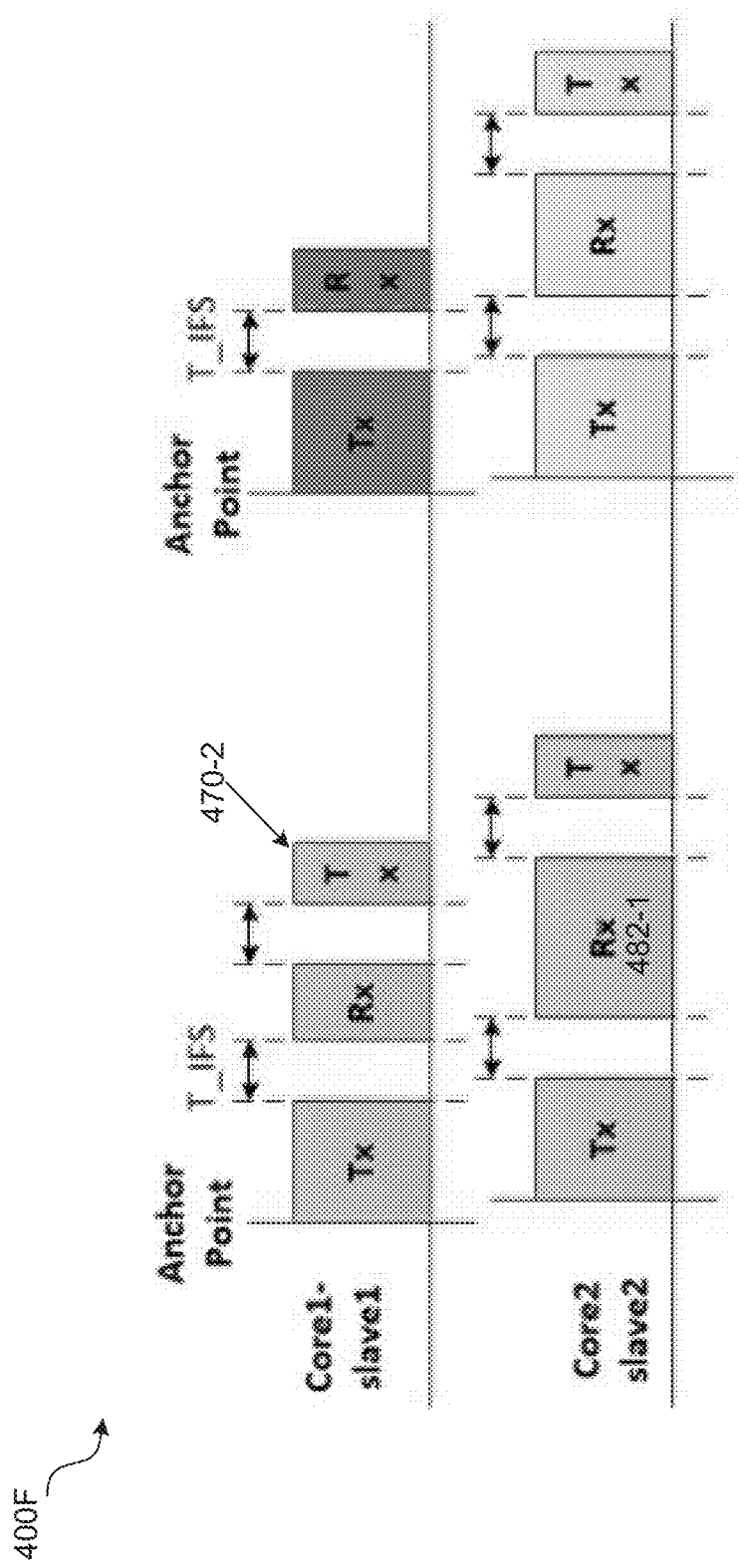

The time management scheme 400F shown in FIG. 4F for connection between two BT cores (e.g., Core 1 and Core 2)

and two slave devices (e.g., slave 1 and slave 2). In the example time management scheme 400F, Core1 needs to start a Tx event 470-2 before Rx event 482-1 of Core 2 is completed. The Tx event 470-2 inevitably affects Rx performance of Core 2 under normal circumstance. By using an overwriting scheme, Core 2 can stop the second Tx event 470-2 of Core 1 to make sure that its Rx event 482-1 is done successfully. It is possible to continue the second Tx event 470-2 of Core 1 if its Tx power is low enough such that it does not interfere with Rx event 482-1 of Core 2. This is done by de-sensing Tx power of Core 1, that is, to lower power level of the second Tx event 470-2 of Core 1 to such a value that the signal integrity of the Rx event 482-1 of Core 2 can be guaranteed. The application of the de-sense is the best effort, as the Tx signal could be too weak for the intended Rx device to detect it completely and unmistakably. If the Rx device has receiving errors it can ask for a retransmission of the same packet via a BR/EDR or LE baseband protocol.

Figure 5A:
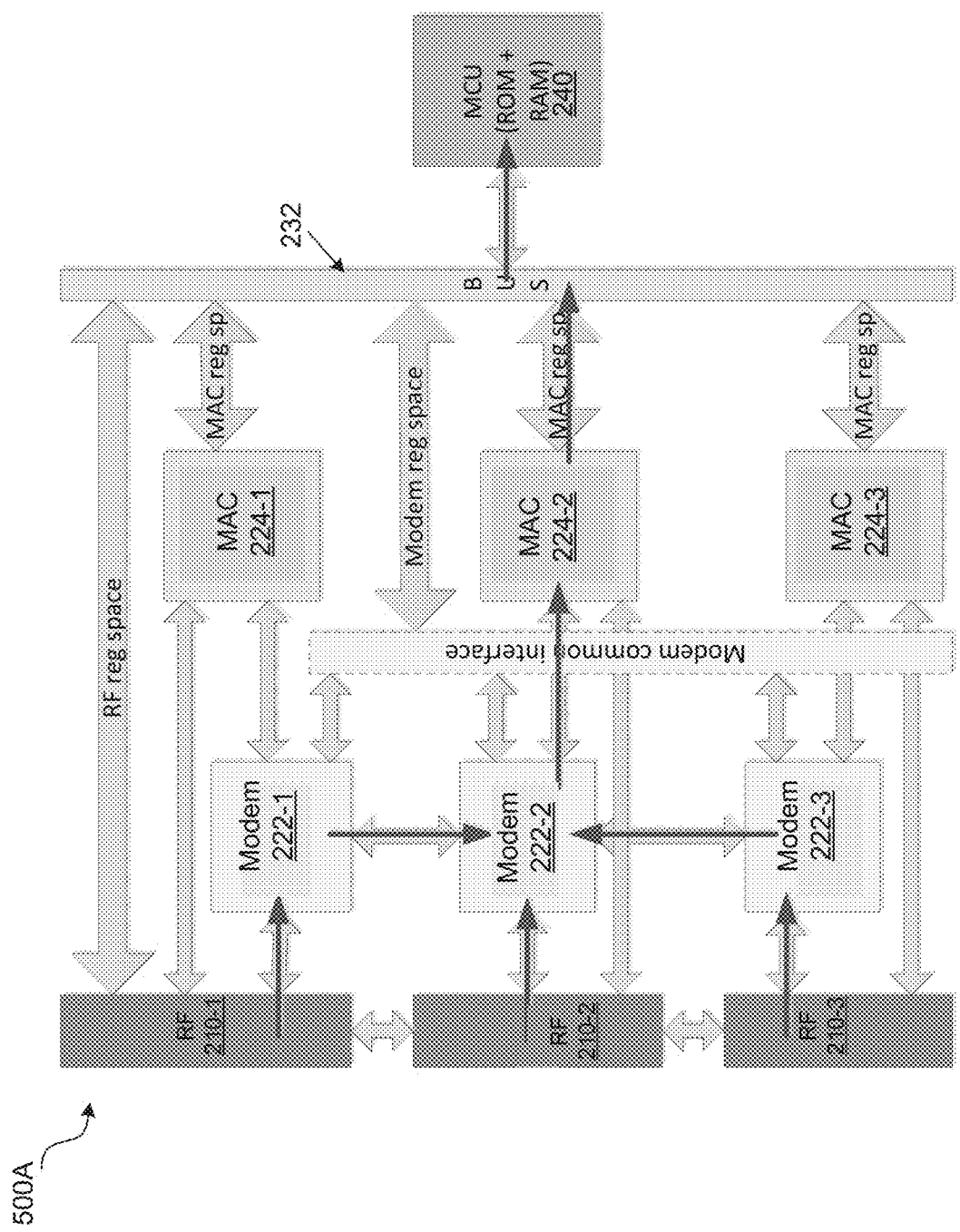
FIGS. 5A through 5D are schematic diagrams illustrating example implementation schemes of a maximum-ratio combining (MRC) scheme in a multiple BT cores system, according to aspects of the subject technology.

FIGS. 5A though 5D are schematic diagrams illustrating example implementation schemes 500A through 500D of a maximum-ratio combining (MRC) scheme in a multiple BT cores system, according to aspects of the subject technology. Not all of the depicted components may be used in all implementations; however, one or more implementations may include additional or different components than those shown in the figure. Variations in the arrangement and type of the components may be made without departing from the spirit or scope of the claims as set forth herein. Additional components, different components, or fewer components may be provided.

When two or more cores are used to receive signal from a single source, MRC technology can be employed to increase the sensitivity of this link. The example implementation scheme 500A shown in FIG. 5A is an illustration of performance of the MRC operation by a 3-core system similar to the SOC 200 of FIG. 2. The dark arrows show the signal flow within the three BT cores. The RF circuits 210-1, 210-2 and 210-3 send their respective Rx signal to modems 222-1, 222-2 and 222-3, respectively. Subsequently, the modems 222-1 and 222-3 send their information to the modem 222-3. The modem 222-2 combines the three copies of information to perform the next step operation. The bit stream obtained from the combined modem signals is sent to the MAC unit 224-2 by the modem 222-2 for baseband level processing. The MRC scheme increases the Rx sensitivity of the multi-core SoC system and yields a robust wireless link. This approach can be applied to either BR/EDR cores or LE cores. The number of cores participated in this process can be 2 or more depending on how the SoC is built.

The multiple BT or LE cores and MRC functionality make transmit beamforming (TxBF) practical. TxBF is a versatile technique for signal transmission from an array of N antennas to one or multiple users. In the subject technology, the focused is on the TxBF to a single user. During MRC phase each modem can generate a set of data about performance metric of each RF circuit from the specific peer device with the channel frequency used. The SoC (modem, baseband and firmware) can subsequently decide which RF circuit performs the best for the desired peer device and the corresponding frequency. The SoC can subsequently select this frequency and RF circuit to transmit to achieve the best performances. For BR/EDR master operation, the firmware would have to collect and process the Rx path information because the master Tx may happen on a channel that no recent estimation of which are at hand. The firmware can try to use the closest neighboring channel information in this case. As a BR/EDR slave the channel and RF information can be used right away. For LE master, if the master is going to send multiple packets in the same connection event, the second Tx can use the estimated channel information from the previous Rx. It is understood that the channel information can be connection dependent. The firmware may store and maintain estimated channel information per RF circuit per connection. The firmware will use this data combined with new data if viable to decide which RF circuit to use for which frequency. This also allows the SoC to be designed in such a way that it can use any MAC/Modem/RF combination to communicate with any peer devices. The entire decision making and RF switching can happen during runtime, aka, almost instantly.

Figure 5B:
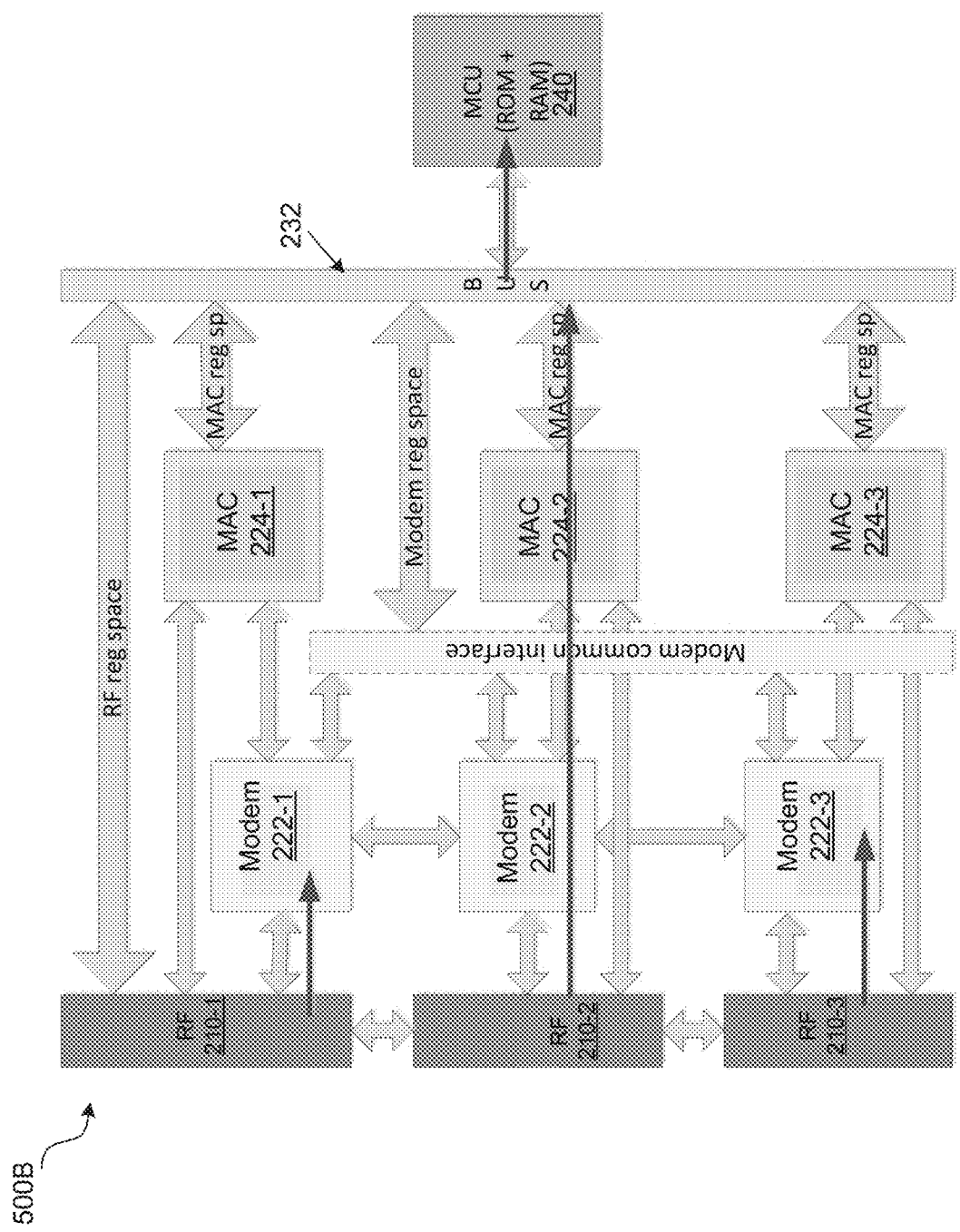

In the example implementation scheme 500B shown in FIG. 5B, the MCU 240 instructs N radios to listen to the same frequency from a single radio source. At the very early stage of the packet reception the PHY layers inside the modems 222 evaluate the signal qualities, decide that the best signal is over the threshold such that MRC is not needed, and subsequently choose the best performance radio to continue to receive and shut down the rest of the radios. It can be seen in FIG. 5B that only path from RF 210-2 is allowed to complete the receiving task while the rest of the radios stop receiving at a very early stage. The advantage of this approach is that it yields good performance as long as one radio path has a good quality signal. It uses less power than the MRC mode. Of course MRC will need to be turned on if the best signal from all the radios is not good enough.

Figure 5C:
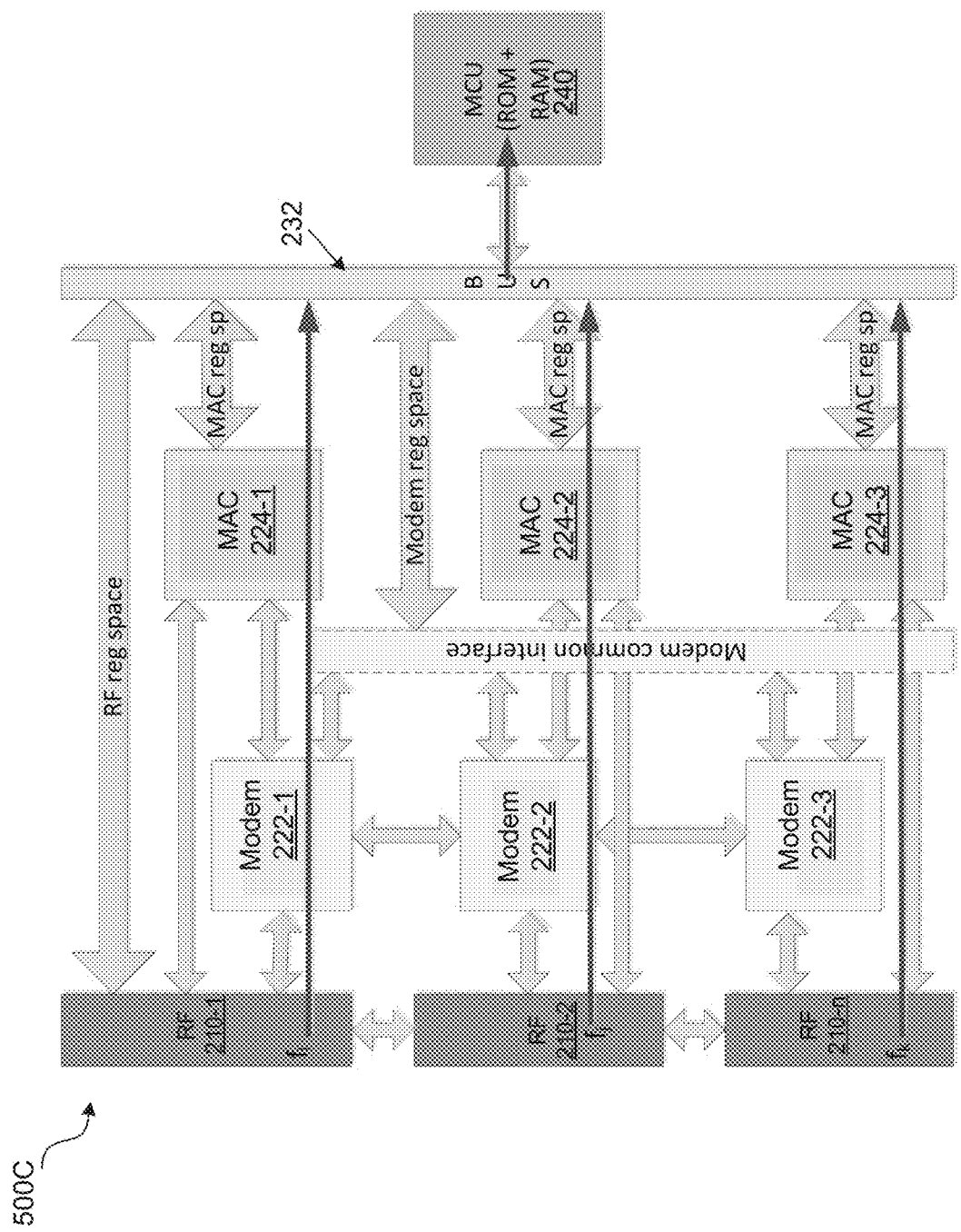

The implementation scheme 500C depicted in FIG. 5C shows that with a multi-core SoC it is possible to scan at multiple frequencies at the same time. As seen in FIG. 5C, core 1 searches frequency $f_i$, core 2 does frequency $f_j$, and core n covers frequency $f_k$. By doing simultaneous scanning the SoC can cover all the LE advertising channels with a three or more core SoC architecture to avoid scan one frequency a time by today's single core approach. For beacon scanning three or more core SoC uses only one third of the time to cover all the LE beacon advertising channels.

Figure 5D:
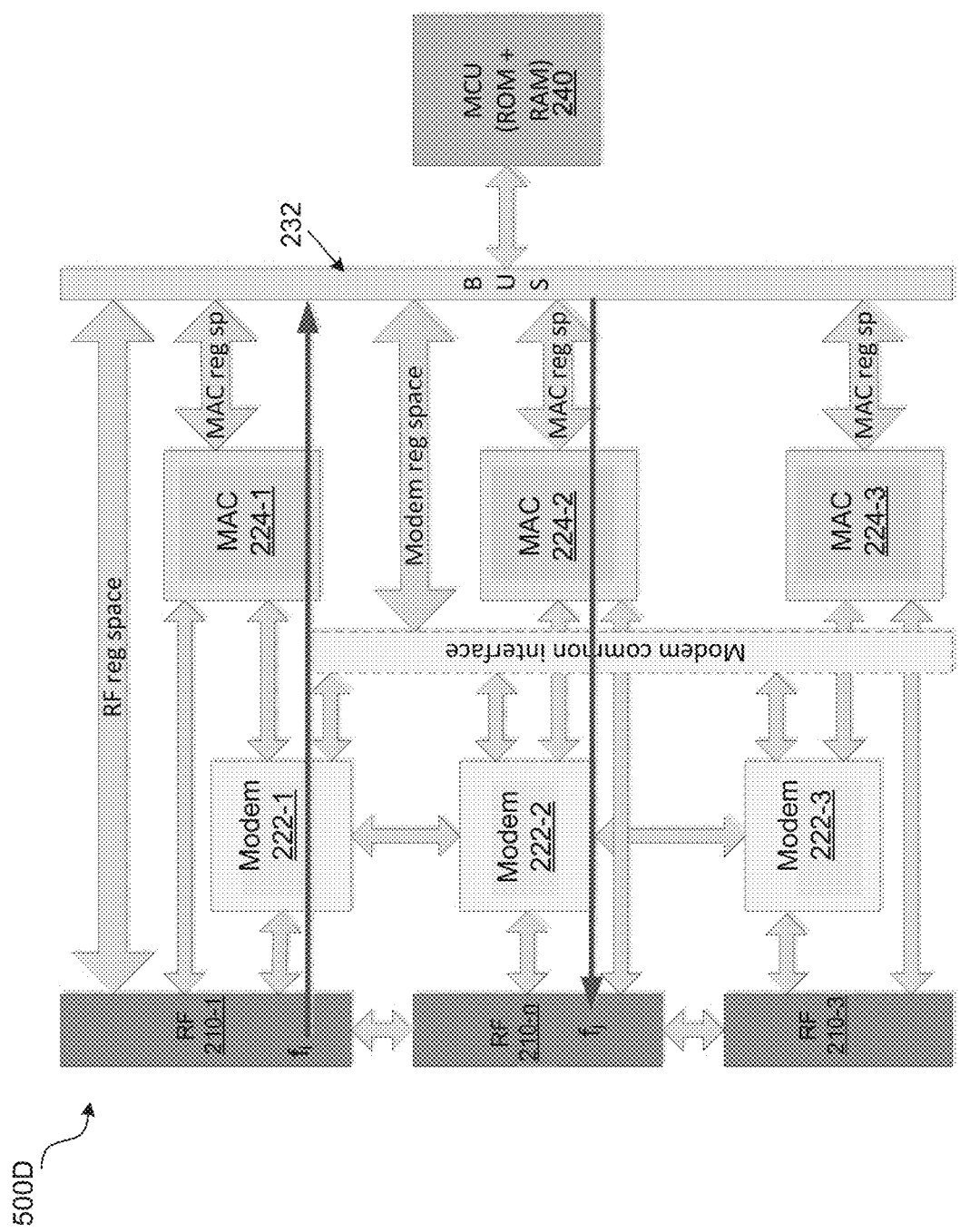

In some implementations, a two or more core SoC can function as a low power repeater. As shown in the implementation scheme 500D of FIG. 5D, the multi-core SoC can use one core to receive a signal at frequency $f_1$ and another core to repeat the signal at frequency With this approach, the BT and/or LE technology can effectively double the distance with one repeater. If N repeater is used on a linear fashion across the space the distance can be extended to (N+1) times, which is a significant advantage for some special usage scenarios.

FIGS. 6A-6B are conceptual diagrams illustrating examples of use cases 600A and 600B of a multiple BT cores system, according to aspects of the subject technology. As shown in the use case 600A of FIG. 6A, a smart phone 602 can connect to a stylus 604, a headset 606, and a watch 608. This would be, for example, a scenario that a user is listening to music (or on a phone call), using a stylus 604 to write some quick notes. The watch 608 may be around and connected if the user wears a watch. In this case MRC and TxBF can be used to have a robust link performance. It is also possible to use one dedicated core for LE operation to connect with the stylus while the BR/EDR core is used to handle the headset (assuming A2DP headset) and the watch.

The use case 600B of FIG. 6B is similar to the previous use case, except the user may be walking towards a computing device 610 or getting close to a Wi-Fi access point (AP) 620. The user could transfer the application running on the smart phone 602 to the computing device 610, or the user may enable the smart phone 602 to switch the cell phone connection to the Wi-Fi connection. In order to accomplish this goal, the smart phone 602 would need to scan its surrounding for devices that it may be interested in. This scanning activity would need to take bandwidth away from the active user activities (e.g., stylus 604, headset 606 and watch 608). A fast detection would need more scanning bandwidth which could negatively impact the stable activities if a single BR/EDR/LE core device is used. With a second core that can do scanning and discovery, a better user experience can be provided. Additionally, when more than one core is used, the MRC and TxBF can be enabled, if needed.

Figure 7:
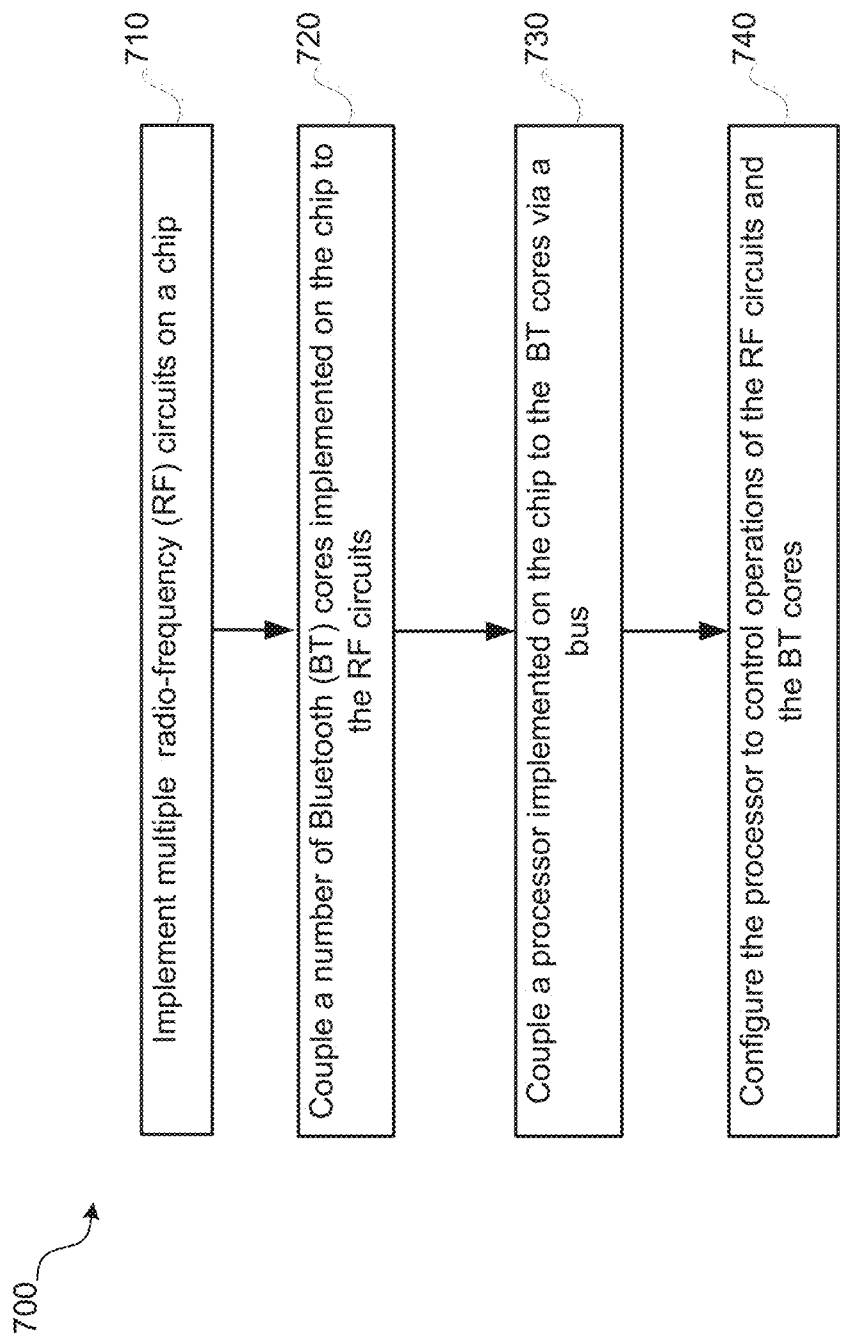
FIG. 7 is a flow diagram illustrating an example method of implementing multiple BT cores system on a chip, according to aspects of the subject technology.

FIG. 7 is a flow diagram illustrating an example method 700 of implementing multiple BT cores system on a chip, according to aspects of the subject technology. The method 700 includes implementing a number of RF circuits on a chip (710). The method 700 further includes coupling a number of Bluetooth (BT) cores (e.g., 120 of FIG. 1A) implemented on the chip (e.g., SoC 100 of FIG. 1A) to the RF circuits (e.g., 110 of FIG. 1A) (720). A processor (e.g., 140 of FIG. 1A) implemented on the chip is coupled to the BT cores via a bus (e.g., 130 of FIG. 1A) (730). The processor is configured to control operations of the RF circuits and the BT cores (740). Controlling the operations of the RF circuits and the BT cores includes controlling register spaces associated with the RF circuits and the BT cores (e.g., via links 116, 126 and 128 of FIG. 1B).

Figure 8:
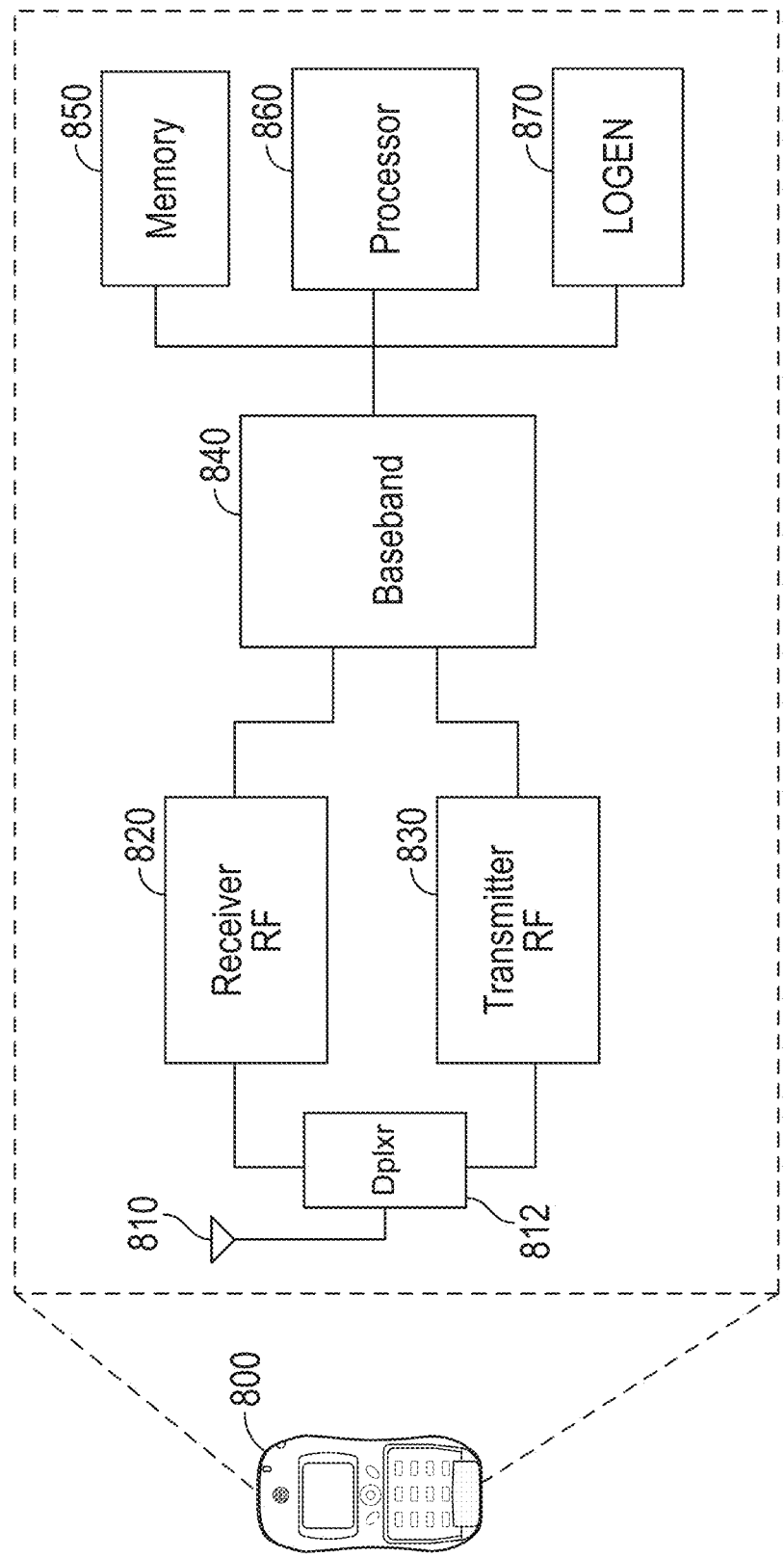
FIG. 8 is a block diagram illustrating an example wireless communication device implementing aspects of the subject technology.

FIG. 8 is a block diagram illustrating an example wireless communication device implementing aspects of the subject technology. Not all of the depicted components may be used in all implementations; however, one or more implementations may include additional or different components than those shown in the figure. Variations in the arrangement and type of the components may be made without departing from the spirit or scope of the claims as set forth herein. Additional components, different components, or fewer components may be provided.

The wireless communication device 800 may comprise a radio-frequency (RF) antenna 810, a receiver 820, a transmitter 830, a baseband processing module 840, a memory 850, a processor 860, and a local oscillator generator (LOGEN) 870. In various embodiments of the subject technology, one or more of the blocks represented in FIG. 8 may be integrated on one or more semiconductor substrates. For example, the blocks 820-870 may be realized in a single chip or a single system on chip, or may be realized in a multi-chip chipset.

The RF antenna 810 may be suitable for transmitting and/or receiving RF signals (e.g., wireless signals) over a wide range of frequencies (e.g., 60 GHz band). Although a single RF antenna 810 is illustrated, the subject technology is not so limited.

The receiver 820 may comprise suitable logic circuitry and/or code that may be operable to receive and process signals from the RF antenna 810. The receiver 820 may, for example, be operable to amplify and/or down-convert received wireless signals. In various embodiments of the subject technology, the receiver 820 may be operable to cancel noise in received signals and may be in close proximity to over a wide range of frequencies. In this manner, the receiver 820 may be suitable for receiving signals in accordance with a variety of wireless standards. Wi-Fi, WiMAX, Bluetooth, and various cellular standards. In various embodiments of the subject technology, the receiver 820 may not require any SAW filters and few or no off-chip discrete components such as large capacitors and inductors.

The transmitter 830 may comprise suitable logic circuitry and/or code that may be operable to process and transmit signals from the RF antenna 810. The transmitter 830 may, for example, be operable to up-convert baseband signals to RF signals and amplify RF signals. In various embodiments of the subject technology, the transmitter 830 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 830 may be operable to provide signals for further amplification by one or more power amplifiers. In some implementations, the transmitter 830 may include one or more RF feedback power amplifiers (e.g., 100 of FIG. 1) that are linearized using the RF feedback as described above.

The duplexer 812 may provide isolation in the transmit band to avoid saturation of the receiver 820 or damaging parts of the receiver 820, and to relax one or more design requirements of the receiver 820. Furthermore, the duplexer 812 may attenuate the noise in the receive band. The duplexer may be operable in multiple frequency bands of various wireless standards. In some implementations, the receiver 820 and the transmitter 830 may also perform the functionalities of the RF circuits (e.g., 110 of FIG. 1A) of the subject technology.

The baseband processing module 840 may comprise suitable logic, circuitry, interfaces, and/or code that may be operable to perform processing of baseband signals. The baseband processing module 840 may, for example, analyze received signals and generate control and/or feedback signals for configuring various components of the wireless communication device 800 such as the receiver 820. The baseband processing module 840 may be operable to encode, decode, transcode, modulate, demodulate, encrypt, decrypt, scramble, descramble, and/or otherwise process data in accordance with one or more wireless standards. In some implementations, the baseband processing module 840 may also perform the functionalities of the BT cores (e.g., 120 of FIG. 1A) of the subject technology.

The processor 860 may comprise suitable logic, circuitry, and/or code that may enable processing data and/or controlling operations of the wireless communication device 800. In this regard, the processor 860 may be enabled to provide control signals to various other portions of the wireless communication device 800. The processor 860 may also control transfers of data between various portions of the wireless communication device 800. Additionally, the processor 860 may enable implementation of an operating system or otherwise execute code to manage operations of the wireless communication device 800.

The memory 850 may comprise suitable logic, circuitry, and/or code that may enable storage of various types of information such as received data, generated data, code, and/or configuration information. The memory 850 may comprise, for example, RAM, ROM, flash, and/or magnetic storage. In various embodiment of the subject technology, Information stored in the memory 850 may be utilized for configuring the receiver 820 and/or the baseband processing module 840. In some implementations, the processor 860 and the memory 850 may also perform the functionalities of the processor (e.g., 140 of FIG. 1A) or the MCU (e.g., 142 of FIG. 1B) of the subject technology.

The local oscillator generator (LOGEN) 870 may comprise suitable logic, circuitry, interfaces, and/or code that may be operable to generate one or more oscillating signals of one or more frequencies. The LOGEN 870 may be operable to generate digital and/or analog signals. In this manner, the LOGEN 870 may be operable to generate one or more clock signals and/or sinusoidal signals. Characteristics of the oscillating signals such as the frequency and duty cycle may be determined based on one or more control signals from, for example, the processor 860 and/or the baseband processing module 840.

In operation, the processor 860 may configure the various components of the wireless communication device 800 based on a wireless standard according to which it is desired to receive signals. Wireless signals may be received via the RF antenna 810 and amplified and down-converted by the receiver 820. The baseband processing module 840 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 850, and/or information affecting and/or enabling operation of the wireless communication device 800. The baseband processing module 840 may modulate, encode and perform other processing on audio, video, and/or control signals to be transmitted by the transmitter 830 in accordance to various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
a plurality of radio-frequency (RF) circuits;
a plurality of Bluetooth (BT) cores coupled to the plurality of RF circuits; and
a processor coupled to the plurality of BT cores and configured to control operations of the plurality of RF circuits and the plurality of BT cores,
wherein:
the plurality of RF circuits and the plurality of BT cores are implemented on a system on a chip (SOC) and are configured to simultaneously maintain multiple active links,
the plurality of RF circuits and the plurality of BT cores include register spaces, and
controlling the operations of the plurality of RF circuits and the plurality of BT cores are performed by controlling the register spaces included in the plurality of RF circuits and the plurality of BT cores.

2. The apparatus of claim 1, wherein each of the plurality of BT cores is implemented as a media access control (MAC) unit and a modem, wherein modems of the plurality of BT cores are configured to communicate to one another.

3. The apparatus of claim 2, further comprising a common modem interface configured to couple the modems of the plurality of BT cores to at least some of MAC units.

4. The apparatus of claim 3, wherein the common modem interface is configured to couple the modems of the plurality of BT cores to the processor.

5. The apparatus of claim 1, wherein each of the plurality of BT cores is configured to simultaneously receive signals from one or more transmitting devices via one or more receive paths having similar or different channel frequencies.

6. The apparatus of claim 1, wherein the plurality of BT cores are configured to simultaneously transmit signals to one or more receiving devices.

7. The apparatus of claim 6, wherein the processor is configured to perform a frequency management and an antenna desensing scheme for the plurality of BT cores to simultaneously transmit signals to two or more receiving devices.

8. The apparatus of claim 1, wherein the plurality of BT cores are configured to handle multiple connections, and wherein the processor is configured to perform a frequency management to prevent a single channel frequency to be simultaneously used by more than one connection.

9. The apparatus of claim 1, wherein the plurality of BT cores are configured to handle multiple connections, and wherein the processor is configured to perform a timing management to prevent overlapping of a receive (RX) time of a BT core with a transmit (TX) time of another BT core of the plurality of BT cores.

10. The apparatus of claim 1, wherein the processor is configured to combine, using a maximum-ratio combining (MRC) process, signals received from a single source by two or more BT cores of the plurality of BT cores to increase an Rx sensitivity of the apparatus.

11. The apparatus of claim 10, wherein the processor is configured identify an RF circuit of the plurality of RF circuits and a channel frequency that are suitable for transmission to a receiving device and to use the RF circuit and the channel frequency, in a Tx beamforming process, to transmit to the receiving device, wherein the identification is based on information obtained during the MRC process.

12. A method of implementing multiple Bluetooth (BT) cores system on a chip (SoC), the method comprising:
    implementing a plurality of radio-frequency (RF) circuits on a chip;
    coupling a plurality of Bluetooth (BT) cores implemented on the chip to the plurality of RF circuits;
    coupling a processor implemented on the chip to the plurality of BT cores via a bus; and
    configuring the processor to control operations of the plurality of RF circuits and the plurality of BT cores, wherein:
    the plurality of RF circuits and the plurality of BT cores are implemented on a SOC and are configured to simultaneously maintain multiple active links,
    the plurality of RF circuits and the plurality of BT cores include register spaces, and
    controlling, by the processor, the operations of the plurality of RF circuits and the plurality of BT cores comprises controlling the register spaces included in plurality of RF circuits and the plurality of BT cores.

13. The method of claim 12, further comprising implementing each of the plurality of BT cores as a media access control (MAC) unit and a modem and configuring modems of the plurality of BT cores to communicate to one another.

14. The method of claim 13, further comprising implementing on the chip a common modem interface to couple the modems of the plurality of BT cores to at least some of MAC units and to couple the modems of the plurality of BT cores to the processor.

15. The method of claim 12, further comprising configuring the processor to perform a frequency management and an antenna desensing scheme for the plurality of BT cores to simultaneously transmit signals to two or more receiving devices.

16. The method of claim 12, further comprising configuring the processor to combine, using a maximum-ratio combining (MRC) process, signals received from a single source by two or more BT cores of the plurality of BT cores to increase an Rx sensitivity of the multiple BT cores SoC.

17. The method of claim 16, further comprising configuring the processor to identify an RF circuit of the plurality of RF circuits and a channel frequency that are suitable for transmission to a receiving device and to use the RF circuit and the channel frequency and to perform a Tx beamforming process to transmit to the receiving device, wherein the identification is based on information obtained during the MRC process.

18. The method of claim 16, wherein configuring the processor to perform the MRC process comprises configuring the processor to control:
    two or more of the plurality of RF circuits to receive signals from the single source and to pass the received signal to respective modems;
    the respective modem to pass respective modem signals to a single modem;
    the single modem to suitably combine the respective modem signals and to provide a combined modem signal to a single MAC unit; and
    the single MAC unit to provide a respective MAC signal to the processor.

19. A wireless communication device comprising:
    a radio-frequency (RF) block including a plurality of Bluetooth (BT) RF circuits;
    a baseband circuit including a plurality of BT cores coupled to the plurality of BT RF circuits; and
    a processor coupled to the plurality of BT cores and configured to control operations of the plurality of BT RF circuits and the plurality of BT cores,
    wherein:
    the plurality of BT RF circuits and the plurality of BT cores include register spaces,
    at least the plurality of BT RF circuits, the plurality of BT cores and the processor are implemented as system on a chip (SoC), and the plurality of BT RF circuits and the plurality of BT cores are configured to simultaneously maintain multiple active links, and
    the processor is configured to control the operations of the plurality of BT RF circuits and the plurality of BT cores by controlling the register spaces included in the plurality of BT RF circuits and the plurality of BT cores.

20. The wireless communication device of claim 19, wherein each of the plurality of BT cores is implemented as a media access control (MAC) unit and a modem, wherein modems of the plurality of BT cores are configured to communicate to one another, and wherein the baseband circuit further comprises a common modem interface configured to couple the modems of the plurality of BT cores to at least some of MAC units and to couple the modems of the plurality of BT cores to the processor.

* * * * *